Figure 1:
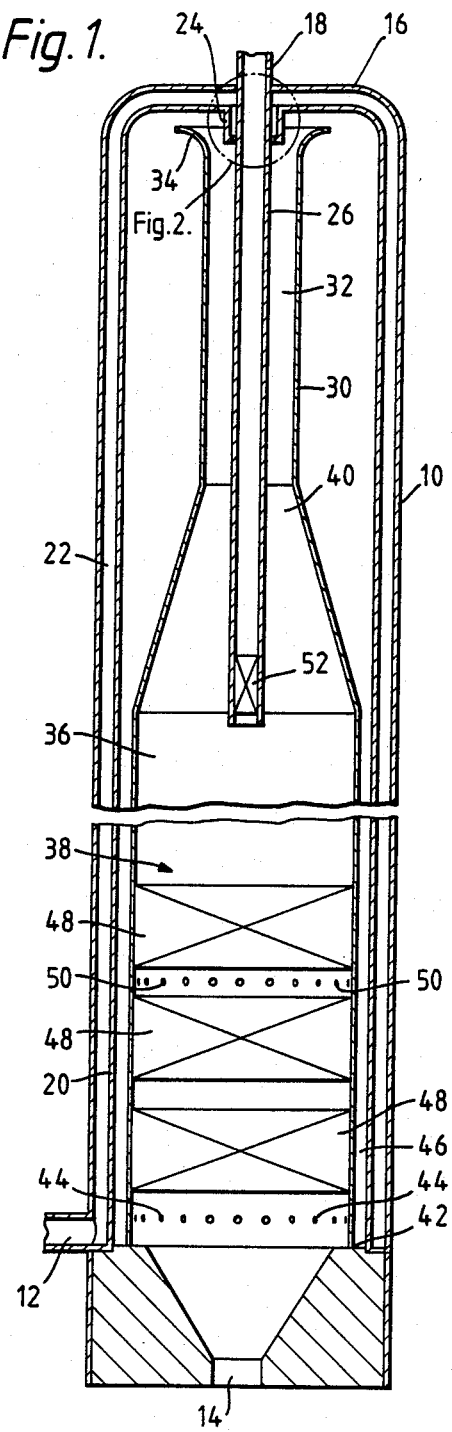

United States Patent [19]

Noakes et al.

[11] Patent Number: 4,938,685
[45] Date of Patent: Jul. 3, 1990

[54] CATALYTIC COMBUSTION

[75] Inventors: Kim P. A. Noakes, Norton; Peter J. Davidson, Darlington, both of England

[73] Assignee: Imperial Chemical Industries PLC, London, England

[21] Appl. No.: 181,031

[22] Filed: Apr. 13, 1988

Related U.S. Application Data

[63] Continuation of Ser. No. 52,004, May 20, 1987, Pat. No. 4,788,004.

[30] Foreign Application Priority Data

Apr. 13, 1987 [GB] United Kingdom ................ 8708776

[51] Int. Cl.$^5$ .............................................. F23D 3/40
[52] U.S. Cl. ........................................ 431/4; 252/373; 423/652; 423/659; 431/7; 431/9; 431/10; 431/170; 431/326
[58] Field of Search ..................... 423/659, 652; 431/7, 431/116, 5, 115, 170, 326, 9, 10; 252/373

[56] References Cited

U.S. PATENT DOCUMENTS

| | | | |
|---|---|---|---|
| 1,239,776 | 9/1917 | Ellis | 431/7 |
| 1,978,518 | 10/1934 | Wetherbee | 431/7 |
| 2,099,092 | 11/1937 | Arnold | 431/116 |
| 2,540,706 | 2/1951 | Beck et al. | 423/659 |
| 2,890,929 | 6/1959 | Rummert | 423/659 |
| 3,604,824 | 9/1971 | Hardison | 431/116 |
| 3,927,958 | 12/1975 | Quinn | 431/116 |
| 3,941,869 | 3/1976 | Fuchs | 423/659 |
| 3,990,831 | 11/1976 | Syska | 431/116 |
| 4,089,630 | 5/1978 | Vollerin et al. | 431/116 |
| 4,197,701 | 4/1980 | Boyum | 431/7 |
| 4,425,159 | 1/1984 | Nixon | 431/5 |

Primary Examiner—John Doll
Assistant Examiner—Wayne A. Langel
Attorney, Agent, or Firm—Cushman, Darby & Cushman

[57] ABSTRACT

Process and apparatus for catalytic combustion in which a combustible gas stream is mixed with part of the recycled hot product stream and then fed to a combustion zone containing a combustion catalyst, and from which the hot pressurized product is obtained. The recycle is preferably effected by means of a constriction at the end of the inlet gas supply producing a region of lower pressure than the pressure of the product gas.

3 Claims, 1 Drawing Sheet

CATALYTIC COMBUSTION

This application is a continuation-in-part of U.S. Ser. No. 52,004, filed May 20, 1987 now U.S. Pat. No. 4,788,004.

CATALYTIC COMBUSTION

This invention relates to catalytic combustion, and in particular to a process, and apparatus suitable therefor, for producing a hot pressurised gas stream. In one form of the invention, a hydrocarbon feedstock is converted to a hot pressurised hydrogen-containing gas stream by the reaction of said feedstock with an oxidant gas containing free oxygen, in the presence of a catalyst.

Such processes are well known and include the so-called catalytic partial oxidation and secondary reforming processes.

In these processes, which are operated continuously and generally effected at elevated pressure, the feedstock stream is partially combusted and then the combustion products are passed over a conversion catalyst, to bring the combustion products towards equilibrium. Where employed, steam and/or carbon dioxide, is included in one or both of the reactant streams or may be fed as a separate stream.

While there have been proposals, for example in "Chemical Engineering" Jan. 3 1966 pages 24–26, GB-A-1137930, and U.S. Pat. No. 4,522,894, of autothermal reforming wherein the combustion is effected catalytically, for example by the provision of a bed of a combustion catalyst upstream of the conversion catalyst, such processes suffer from the disadvantage that there is a risk that the combustion catalyst will become deactivated by continued exposure to high temperatures and/or by the deposition of carbon. Also there is a risk that the feedstock may autoignite and the resulting flame will damage the combustion catalyst and/or the vessel.

It is therefore more usual to employ non-catalytic combustion by feeding the reactants to a burner whereat a flame is formed.

EP-A-No. 254395 (which was not published until after the claimed priority date of the present application and which corresponds to U.S. Ser. No. 52,004) discloses the use of catalytic combustion of a gaseous stream containing a hydrocarbon feedstock to provide a hot gas stream for use in the start-up of a process employing a burner to effect non-catalytic combustion, wherein a feedstock stream is reacted with an oxidant gas stream containing free oxygen. In preferred forms of that process the catalytic combustion was operated under conditions giving a hot pressurised gas stream containing a proportion of hydrogen.

The present invention relates to a process, and apparatus, of particular utility in such processes where the hot pressurised gas stream is desired to contain hydrogen, and/or is desired to have a low concentration of free oxygen, e.g. for use in downstream operations where the presence of free oxygen can not be tolerated.

However as will be described hereinafter, the invention is also of utility in other processes.

Accordingly the present invention provides a process for the production of a hot pressurised gas stream by catalytic combustion comprising:
(a) feeding to a mixing zone at superatmospheric pressure a first first gas stream containing combustible gas;
(b) separately feeding, at superatmospheric pressure, to the inlet of a combustion zone containing a combustion catalyst:
the gas stream from the mixing zone, and
a second gas stream containing free oxygen;
(c) effecting at least partial combustion of said combustible gas in the combustion zone to produce a hot product gas stream; and
(d) recycling part of the hot product gas stream to said mixing zone and therein mixing that recycled hot product gas stream with the first gas stream;
whereby the gas stream from said mixing zone that is fed from the mixing zone to the inlet of said combustion zone is a mixture of the recycled hot product stream and the first gas stream. Provision of recycle of part of the hot product gas stream thus has the effect of preheating the gas fed to the combustion catalyst, thereby rendering the catalytic combustion easier.

In a preferred form of the invention the first gas stream comprises a feedstock containing at least one hydrocarbon and and at least one of said first and second streams contains steam, and the amount of free oxygen as supplied by said second gas stream is insufficient to effect complete combustion of said first gas stream.

The first and second gas streams are preferably fed at a pressure in the range 2 to 70 bar abs, particularly 5 to 60 bar abs.

Combustion catalysts may also promote other reactions such as shift conversion, and steam reforming. The provision of steam in at least one of said first and second streams, together with a combustion catalyst which shows some steam reforming activity, allows a proportion of hydrogen to be formed in the hot product gas stream. In this case the recycle of part of the hot product gas stream thus also has the effect of introducing hydrogen into the gas mixture that is subject to the partial combustion: since hydrogen is more readily combusted catalytically than hydrocarbon components such as methane in the feedstock, this also renders the catalytic combustion more effective. Also, since hydrogen has a lower autoignition temperature than such hydrocarbon components, the autoignition temperature may be attained more readily (where, as described below, autoignition is desired).

In another form of the invention the hot gaseous products from the combustion zone are passed through a further zone containing a catalyst suitable to effect a separate catalytic reaction on the hot gaseous products e.g. shift conversion, before the products from that catalyst zone are in part recycled to the mixing zone.

The desired recycle of hot product gas can be induced by creating a suitable pressure differential between the hot product the hot product gas and the first stream. A suitable pressure differential can be achieved by the use of a means providing a constriction, having the effect of an ejector, wherein the flow of of the first gas stream through the constriction generates a low pressure region. The difference in pressure between the low pressure region and the pressure of the hot product stream results in the desired recycle flow of hot product gas to the low pressure region, wherein intimate mixing of the two streams is effected.

The above use of the principle of an ejector so as to effect a recycle of part of the hot product stream may also be applied in other exothermic reactions to effect preheating of the gas fed to the catalyst to improve the catalytic performance, and/or to suppress undesired side reactions. In some such processes there may be no need for a second gas stream.

Accordingly the invention further provides a process for the production of a hot pressurised gas stream by an exothermic catalytic reaction comprising:
(a) passing a first gas stream containing a reactant gas, at superatmospheric pressure, through a constriction whereby a lower pressure region is created;
(b) feeding the gas stream from the lower pressure region to a zone containing a catalyst for said exothermic catalytic reaction and therein effecting said exothermic catalytic reaction to produce a hot product gas stream; and
(c) recycling part of the hot product gas stream to the lower pressure region;
whereby the gas stream that is fed from the lower pressure region to the inlet of the catalyst zone is a mixture of the recycled hot product stream and the first gas stream, and the passage of the first gas stream through the constriction provides that the pressure in said lower pressure region is sufficiently below the pressure of the said hot product gas stream to cause said recycle.

As will be described below, for any given apparatus, when operating under specified design conditions, the proportion of the hot product gas that is recycled tends to decrease as the system is started up. It is preferred that, after such start-up and having achieved steady-state operating conditions, the proportion of the hot product gas stream that is recycled is from 20 to 95%, particularly at least 40%, and preferably from 50 to 80%, of the hot product gas leaving the combustion zone.

The present invention also provides apparatus for use in a process wherein a hot pressurised gas stream is produced by catalytic combustion comprising:
(a) an outer cylindrical shell provided with inlet ports for the first and second streams, and an outlet port for the hot product gas stream;
(b) a hollow member, having inlet and outlet ends, disposed within, and extending for a major proportion of the length of, the shell and defining an annular space between said shell and said hollow member, the interior of said hollow member communicating with said annular space at each end thereof, and at its outlet end, communicating with the outlet port;
(c) first supply means, connected to the inlet port for the first gas stream and terminating adjacent the inlet end of said hollow member, for supplying the first gas stream from the inlet port therefor to the interior of the hollow member;
(d) second supply means for supplying the second gas stream from the inlet port therefor to the interior of the hollow member comprising means connected to the inlet port for the second gas stream and extending into the interior of the hollow member, said second supply means terminating within said hollow member at a location downstream of the termination of said first supply means; and
(e) a combustion catalyst bed located with said hollow member downstream of the termination of the second supply means.

The combustion catalyst is preferably a precious metal, e.g. platinum, supported on a suitable support such as a refractory material, e.g. alpha alumina. The support preferably has a monolithic honeycomb structure, as such structures give rise to a low pressure drop hence allowing a significant recycle of the product gas.

As previously stated the production of a hot pressurised gas stream by an exothermic reaction may under some conditions not require the supply and use of a second gas stream. The provision of a recycle of hot product gases could however be of benefit. A constriction means can be employed within the apparatus in which such an exothermic reaction takes place to produce the effect of an ejector, thereby inducing the recycle of hot product gases.

Accordingly the present invention further provides an apparatus for use in such a process wherein a hot pressurised gas stream is produced by an exothermic catalytic reaction comprising:
(a) an outer cylindrical shell provided with an inlet port for an inlet gas stream, and an outlet port for the product gas stream;
(b) a hollow member, having inlet and outlet ends, disposed within, and extending for a major proportion of the length of the shell, and defining an annular space between said shell and said hollow member, the interior of said hollow member communicating with said annular space at each end thereof, and at its outlet end, communicating with the outlet port;
(c) supply means connected to the inlet port and terminating in a constriction means adjacent the inlet end of said hollow member, for supplying the inlet gas stream from the inlet port to the interior of the hollow member;
(d) a catalyst bed located within said hollow member downstream of the termination of the said supply means.

A particular embodiment of the apparatus will now be described, wherein a hot pressurised gas stream is produced by catalytic combustion.

For convenience of description the apparatus will be described as if the shell is mounted vertically with the inlet end of the hollow member uppermost. However it will be appreciated that such spatial disposition of the apparatus is not essential.

The hollow member is preferably of circular cross section having a cylindrical inlet region of smaller diameter than the region thereof containing the combustion catalyst, with a conical transition section between these two regions. The cylindrical inlet region and the conical transition section thus can act as a diffuser. The first supply means may extend into the inlet region of the hollow member or, where the hollow member does not extend at its upper, inlet, end to the end of the shell, the first supply means may terminate above the hollow member. The second supply means for the second stream extends into the hollow member to a location below the end of the first supply means and preferably extends for at least a major portion of the length of the inlet region. The first supply means is preferably provided at its outlet end with a constriction to act as an ejector. The second supply means may be similarly provided. As described below, where the upper end of the hollow member is open so that it does not extend to the end of the shell, the open end of the inlet region may be flared in the vicinity of the ejector on the first supply means.

The interior of the hollow member communicates at each end with the annular space between the hollow member and the shell. Where one or both ends of the hollow member extends to the end of the shell, the appropriate communication may be provided by holes in the wall of the hollow member adjacent the relevant end thereof. Where the combustion catalyst is provided in the form of a plurality of longitudinally spaced catalyst sections, in some cases it may be desirable to provide openings in the wall of the hollow member communicating with the region, or regions, between adjacent catalyst sections to provide, as described below, for some recycle of the gas stream before passage thereof through the whole of the combustion catalyst.

The invention is illustrated by reference to the accompanying drawings wherein

Figure 2:
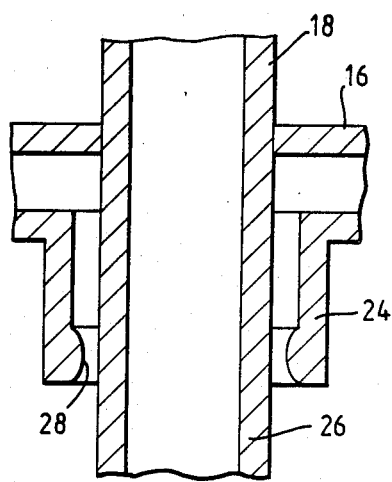

FIG. 1 is a diagrammatic longitudinal section through one embodiment of the apparatus, and FIG. 2 is an enlargement of that part of FIG. 1 within the dotted line.

In the embodiment of FIGS. 1 and 2, the apparatus consists of an outer cylindrical shell 10 designed to withstand the process pressure, which is typically in the range 5 to 60 bar abs. At one end of the shell 10 is an inlet port 12 for a first gas stream consisting of a steam/natural gas mixture, and an outlet port 14 for the product gas stream. At the other end 16 of the shell 10 is an inlet port 18 for the second gas stream, air. Located within the shell 10 and sealed thereto at the end adjacent inlet port 12 is a liner 20. Liner 20 extends almost to the other end 16 of the shell 10 and thus defines an annular conduit 22 between the interior surface of the shell 10 and the exterior surface of the liner 20. Inlet port 12 connects with this annular conduit 22. At the end 16 of the shell 10, liner 20 extends across the end of the shell 10, and terminates in a cylindrical portion 24 surrounding, but spaced from, an air supply pipe 26 forming the air supply means from air inlet port 18. The end of the cylindrical portion 24 that is remote from the end 16 of the shell 10 is provided with an inward enlargement 28, see FIG. 2, thus providing a constriction between the end of cylindrical portion 24 and the air supply pipe 26 to act as an ejector.

The conduit defined by liner 20, the wall of shell 10, the cylindrical portion 24, and the external surface of the air supply pipe 26, thus forms the supply means for delivering the first gas stream from the inlet port 12. Since the structure is thus of the hot-wall type so that the gas flowing through conduit 22 acts as a coolant, the amount of refractory insulation, if any, required on the shell 10 can be kept relatively small.

Located within liner 20 is a elongated hollow member 30 of circular cross section. This hollow member has an inlet region 32 having an open, flared, end 34 adjacent the ejector terminating the first gas stream supply means, a combustion region 36 of greater cross section than the inlet region 32 and containing, at the end thereof remote from inlet region 32, the combustion catalyst 38, and a conical transition section 40 connecting the inlet region 32 with the combustion region 36. Below the combustion catalyst the lower end 42 of hollow member 30 is supported on the end of shell 10. Provision is made, e.g. by providing holes 44 through the wall of the hollow member 30 adjacent the end 42, for gas exiting the combustion catalyst 38 to enter the space 46 between the external surface of the hollow member 30 and the interior surface of liner 20. Part of the gas leaving the catalyst can thus enter space 46 while the rest leaves the shell 10 via outlet port 14. The combustion catalyst 38 comprises a number of honeycomb sections 48 on the surface of which is deposited a suitable metal that has combustion activity. Openings 50 are also provided in the wall of the hollow member 30 between adjacent sections of the honeycomb so that part of the gas stream can enter space 46 without passage through the whole of the combustion catalyst 38.

The air supply pipe 26 extending from inlet port 18 extends along the length of the inlet region 32 of hollow member 30 and terminates at the commencement of the combustion region 36 thereof. At the outlet of air supply pipe 26 there is provided a nozzle 52.

In operation natural gas and steam is fed under pressure to inlet port 12 and air is fed under pressure to inlet port 18. The natural gas/steam mixture flows up the space 22 between shell 10 and liner 20 and emerges through the ejector formed by inward enlargement 28, to form a lower pressure region immediately downstream thereof. The mixture then flows down through the inlet region 32 and conical transition section 40 of hollow member 30, where it is mixed with air emerging from nozzle 52. The resultant mixture then flows through the combustion region 36 and the combustion catalyst 38 therein. Part of the gas stream leaving the combustion catalyst 38 flows out through outlet port 14. Because the pressure in the low pressure region is below the pressure of the product gas, the remainder of the product gas flows through holes 44 into space 46 between hollow member 30 and liner 20 and then up towards the end 16 of the shell 10 and is drawn into the inlet region 32 of the hollow member 30 by the effect of the natural gas/steam mixture emerging from the ejector formed by inward enlargement 28. The recycled gas thus mixes with the natural gas/steam mixture and flows down through the hollow member 30.

Initially some reaction takes place as the gas stream passes over the combustion catalyst 38, thereby creating a hot gas stream. The part of the hot gas stream entering the space 46 via holes 44 and recycling back to the inlet region 32 of hollow member 30 heats the natural gas/steam mixture flowing through annular conduit 22 thereby raising the temperature thereof so that the gas entering the combustion catalyst is preheated. The recycled hot gas stream also heats the air as the latter flows through the air inlet supply pipe 26 extending through the inlet region 32, and conical transition section 40 of the hollow member 30. With continued operation the temperature of the gas entering the combustion region 36 increases until the autoignition temperature is reached whereupon a flame is produced at the nozzle 52. As mentioned above, because of the reforming activity of the combustion catalyst 38, the hot gas stream leaving the combustion region 36 of hollow member 30, and hence the hot gas mixture that is recycled, will contain some hydrogen so that the gas mixture mixing with the air at nozzle 52 contains hydrogen, thereby enabling a flame to be established more rapidly at nozzle 52.

It will be appreciated that when a flame is established, the recycled hot gas flowing up that portion of the space 46 between the combustion region 36 of hollow member 30 and the inner surface of liner 20 will be heated by heat exchange across the wall of the combustion region 36 and at the same time will heat the natural gas/steam mixture flowing through the corresponding portion of annular conduit 22 between the inner surface of shell 10 and the outer surface of liner 20. As the recycled hot gas flows through that part of the space 46 between the external surface of the conical transition section 40 and inlet region 32 of the hollow member 30 and the interior surface of liner 20, it will heat not only the natural gas/steam mixture flowing through annular conduit 22 between shell 10 and liner 20, but also the gas flowing through the inlet region 32 and conical transition section 40 of the hollow member 30.

In an alternative embodiment the liner 20 is omitted and the shell 10 is provided with a refractory insulating layer on its interior surface. In this embodiment the first gas supply means comprises a pipe, coaxial with the air supply pipe 26, provided at its end with an inward enlargement, corresponding to inward enlargement 28 in FIG. 2, to form the constriction providing the ejector. In this embodiment there is therefore no preheating of the first gas stream by the recycled hot gas before the first gas stream leaves the feed pipe, but a heated mixture of the first gas stream and the recycled hot gas is formed by the simple mixing of the two gas streams prior to the mixing with the second gas stream leaving the air supply pipe 26.

In either embodiment suitable projections may be provided on the exterior surface of the hollow member 30 to locate it in the desired spaced relation from liner 20 in the embodiment of FIG. 1 or from the refractory lining in the alternative embodiment. Likewise suitable spacers may be provided between the interior surface of the hollow member 30 in the inlet region 32 thereof and the air supply pipe 26 to maintain these components in the desired spaced relationship.

One advantage of the recycle in a process where there is only partial combustion and one or both of the feed streams contain steam, is that, after autoignition has been achieved, the product gas leaving the combustion catalyst will have a temperature somewhat below the maximum temperature in the combustion zone upstream of the catalyst by virtue of the fact that, since the combustion catalyst exerts some steam reforming activity, such reforming, which is endothermic, will take place as the gas passes through the catalyst. The recycled product gas, being cooler than the gas inside the combustion zone thus serves to maintain the hollow member 30 at an acceptable temperature and so it is not necessary that the hollow member 30 has to be constructed of a material that has to withstand very high temperatures.

The system can conveniently be started up with the first gas stream being fed at or near the design rate and then the flow of the second gas stream is commenced, at a slow rate, and then the flow rate of the second stream is gradually increased. At slow second gas stream flow rates essentially all the combustion takes place in the initial portions of the combustion catalyst 38. Hence gas that is recycled through the holes 50 (if such holes are provided) is hotter than product gas that passes all the way through the combustion catalyst 38 (since the latter will cool as a result of heat transfer with colder combustion catalyst and/or endothermic reforming taking place) and so the recycled gas is hotter than if there had been no holes 50. By virtue of the recycled gas mixing with the incoming first stream and, where there is a liner 20 as in the embodiment of FIGS. 1 and 2, heat exchange across such a liner, the first stream becomes preheated before it meets the incoming second gas stream. This preheating enables the catalytic combustion to occur earlier in the catalyst containing zone and so enables the flow rate of the second stream to be increased more rapidly. Within a short time the second gas flow rate can be increased to the level at which the product gas has the desired flow rate and temperature. For any given apparatus and flow rate of first gas of given composition, it will generally be found that the product gas outlet temperature depends on the rate of supply of oxygen, e.g. as air, to the combustion zone. Hence the process may readily be controlled by controlling the flow rate of the second gas stream.

As the flow rate of the second stream is increased, the proportion of recycle will decrease because the addition of the second gas stream increases the mass of gas that is passing through the system but the "driving force" effecting the recycle, i.e. the product of the mass of the first gas stream and the difference between the product gas outlet pressure and the pressure in the aforesaid region of lower pressure, remains essentially constant. Furthermore as the recycle gas stream becomes hotter, the efficiency of the ejector decreases.

It will be appreciated that if the temperature of the recycled hot gas and the degree of recycle is sufficient that the mixture of recycled hot gas, first gas stream and second gas stream attains the autoignition temperature, autoignition will occur with the production of a flame at the nozzle supplying the second gas stream. To avoid damage to the combustion catalyst by such a flame, it is preferred that the second gas stream supply means terminates well upstream of the catalyst so that the flame can occur in a catalyst-free space upstream of the catalyst.

It will further be appreciated that, since the product gas temperature can be controlled by controlling the rate of supply of the second gas stream, it is possible to control the process, if desired, such that the autoignition temperature is not achieved so that the combustion is totally catalytic. If it is intended that the process will be operated without achieving autoignition, then there is no need for a catalyst-free combustion zone upstream of the combustion catalyst: however sufficient space should be provided to ensure good mixing of the first and second gas streams and even distribution of the mixture before encountering the combustion catalyst.

In the foregoing description, the start-up has been described with the assumption that the first gas stream flow rate is kept essentially constant. It will be appreciated that this is not necessarily the case. Indeed where autoignition is established, the rate of feed of the first and/or second gas streams can be increased considerably, after autoignition, since the rates are no longer limited by the need of obtaining combustion in the catalyst.

The present invention is of particular utility where it is desired to obtain a hot, fuel-rich, gas stream from relatively cool reactants. By providing a small heater, for example electrically operated, to heat the inlet gases to about 150° to 200° C. during the initial stages of the start-up procedure, it will be appreciated that it would be possible to operate the process with a feed of cold reactants, e.g. at ambient temperature. However, normally sufficient heating can be obtained from the steam and/or an external source, e.g. as a result of heating occurring on compression of the reactants to the desired operating pressure, to enable start-up to be achieved without the need for such a heater. As mentioned above catalytic combustion is facilitated by the presence of hydrogen in the first gas stream. Consequently, where a source of hydrogen is available, e.g. purge gas from an ammonia synthesis plant, addition of such hydrogen-containing gas to the first gas stream, at least at start-up, is advantageous.

In addition to the production of a hot pressurised fuelrich hydrogen-containing stream as described above, the invention is also of utility where the desired product is an air-, or oxygen-, rich hot gas stream from relatively "cold" reactants, for example for the start-up of a partial oxidation process. Where an air-, or oxygen-, rich product is required, the amount of the second gas stream, i.e. that containing oxygen, should be in an excess of that required for complete combustion of the combustible gas in the first gas stream.

Another application of the invention is in the treatment of relatively "cold" gaseous effluents containing combustible pollutants such as carbon monoxide and/or nitrogen oxides, e.g. tail gas from nitric acid plants. Such pollutants can be efficiently combusted by the process of the invention giving a hot gas stream from which heat may be recovered, e.g. by letting the stream down through a turbine and thus generating power, before discharge of the combusted gas to the atmosphere.

As an example using apparatus of the type depicted in FIGS. 1 and 2 but provided with no openings 48 and dimensioned so that the proportion of the product gas that is recycled, at the design flowrate after start-up has been accomplished, is about 50% of the gas leaving the combustion catalyst, the cylindrical shell is about 3 m length and 40 cm diameter. If a natural gas/steam mixture of steam to carbon ratio of 2.5 is fed at 162 kg mol/hr at a temperature of 200° C. and a pressure of 12 bar abs. as the first gas stream, and air is fed at 146 kg mol/hr at a temperature of 240° C. and 12 bar abs. pressure as the second gas stream, it is calculated that the product gas leaving the shell through outlet port 14 is at 750° C. and has the following composition:

| Nitrogen and argon | 31.7% v/v |
|---|---|
| Carbon dioxide | 7.0% v/v |
| Steam | 29.9% v/v |
| Hydrogen | 25.8% v/v |
| Carbon monoxide | 4.8% v/v |
| Methane | 0.8% v/v |

Under these conditions it is calculated that the natural gas/steam mixture is heated to about 330° C. by the time it leaves ejector formed by constriction 28 and the natural gas/steam/recycle gas mixture entering the transition region has a temperature of about 550° C. It is calculated that autoignition and steady state conditions can be attained within 5 to 10 minutes of commencing flow of the reactants.

By way of comparison, in experiments with a similar arrangement but in which there was no provision for recycle of product gas so that reliance was placed upon transfer of heat back through the catalyst to the combustion zone in order to raise the temperature of the reactants to the autoignition temperature, the time taken to achieve autoignition was over one hour.

We claim:

1. A process for the production of a hot pressurized gas stream by catalytic partial combustion comprising:
   (a) passing a first gas stream, containing at least one hydrocarbon gas, at superatmospheric pressure through a constriction whereby a lower pressure region is created;
   (b) feeding the gas stream from the lower pressure region to the inlet of a combustion zone containing a combustion catalyst that also has steam reforming activity;
   (c) separately feeding to the inlet of the combustion zone a second gas stream, said second gas stream containing free oxygen and at least one of said first and second streams containing steam;
   (d) effecting partial combustion and steam reforming of said hydrocarbon gas in the combustion zone to produce a hot product gas stream containing hydrogen; and
   (e) recycling part of the hot product gas stream to said lower pressure region and therein mixing that recycled hot product gas stream with the first gas stream, the passage of the first gas stream through the constriction providing a pressure in said lower pressure region sufficiently below the pressure of said hot product gas stream to cause said recycle; whereby the gas stream fed from said lower pressure region to the inlet of said combustion zone is a mixture of the recycled hot product stream and the first gas stream and thus contains hydrogen.

2. A process according to claim 1 wherein the first and second gas streams are fed at a pressure in the range 2 to 70 bar abs.

3. A process according to claim 1 wherein on achieving steady-state operating conditions, the proportion of the recycled hot product gas stream is from 20 to 95% of the hot product gas stream leaving the combustion zone.

* * * * *